United States Patent [19]
Schenk

[11] 3,958,321
[45] May 25, 1976

[54] METHOD OF MAKING A SPRING WING STUD

[75] Inventor: Peter Schenk, West Islip, N.Y.

[73] Assignee: Dzus Fastener Co., Inc., West Islip, N.Y.

[22] Filed: May 5, 1975

[21] Appl. No.: 574,533

Related U.S. Application Data

[62] Division of Ser. No. 482,139, June 24, 1974, Pat. No. 3,927,444.

[52] U.S. Cl. .................................. 29/446; 29/526; 29/450
[51] Int. Cl.² ........................................ B23P 11/02
[58] Field of Search ............ 29/453, 446, 450, 526; 24/221 R, 221 A, 221 K

[56] References Cited
UNITED STATES PATENTS

| | | | |
|---|---|---|---|
| 847,253 | 3/1907 | Duersen et al. | 24/221 K |
| 1,423,599 | 7/1922 | Christie | 29/450 X |
| 2,186,557 | 1/1940 | Rosovsky | 29/453 X |
| 2,595,095 | 4/1952 | O'Connor | 24/221 A |
| 2,620,539 | 12/1952 | Poupitch | 29/446 X |
| 2,716,565 | 8/1955 | Harper et al. | 29/446 X |

*Primary Examiner*—Charlie T. Moon
*Attorney, Agent, or Firm*—Kane, Dalsimer, Kane, Sullivan and Kurucz

[57] ABSTRACT

A stud for interengagement with a rigid receptacle to form a fastener assembly. The stud includes an elongated body member with an enlarged head on one end. A gripping surface is on the head to facilitate gripping and rotation of the stud. A spring is also on the head to facilitate axial movement of the stud with respect to the rigid receptacle. One end of the stud has a spiral cam slot terminating in a locking detent thereon. Therefore, when the stud and receptacle are positioned on one of two members respectively and brought into interengagement, the cam slot will be aligned with each cam follower. Thereafter relative rotation between the stud and receptacle will cause the cam follower to enter the cam slot until seated in the locking detent with the assistance of the spring permitting axial movement of the stud with respect to the rigid receptacle thereby locking the two members together. Relative rotation between the stud and receptacle in the opposite direction will move each cam follower from the locking detent and along the cam slot until disengagement occurs whereupon the stud and receptacle can be separated and the two members released with the assistance of the spring permitting axial movement of the stud with respect to the rigid receptacle.

4 Claims, 4 Drawing Figures

METHOD OF MAKING A SPRING WING STUD

This is a division of application Ser. No. 482,139 filed June 24, 1974, now U.S. Pat. No. 3,927,444.

BACKGROUND OF THE INVENTION

There are different types of quarter-turn fasteners available where a one-quarter turn relative movement between fastener element will shift the assembly between a completely locked and a completely unlocked position. This is often accomplished by the use of a spiral cam slot in one of the members and a lateral cam follower in the other. The spiral cam slot is of the type where a locking detent is employed at one end of the cam slot as a retention means in the locked position. In common types of quarter-turn fasteners, such as the type where the spiral cam slot and cam follower are utilized, relative axial movement is required for the cam follower to follow the spiral cam slot along its length. To accomplish this it is common practice to utilize a separate spring member as part of the assembly either as a separate component for the stud assembly or as a resilient part of the receptacle. Naturally, additional components add to the cost of the assembly as well as adding to the complexity of the device.

It should also be kept in mind that in certain environments rigid receptacles are employed. With the requirement of a complete rigid receptacle, a resilient member has to be separately assembled with the stud and receptacle in order to achieve the necessary axial relative movement between components.

Additionally, it has been found that the cost of the fastener assembly can be greatly reduced if the need for a separate receptacle component is eliminated. In place of the separate receptacle to be mounted on one of the two members to be fastened, an appropriate opening for the stud and an appropriate cam follower in the opening can be provided on one of the members to be fastened so it is not necessary to supply an independent receptacle element. The cost of construction of the fastener assembly is accordingly much less and the cost of attaching the fastener elements to the members to be fastened is materially reduced. However, by providing the cam follower and appropriate openings in one of the members, it is difficult if not impossible to integrally include a resilient portion on the member to provide the necessary axial movement for the quarter-turn fastener. A separate resilient member would be required to complete the assembly in workable order. Naturally, the result is an increase in costs in both construction and use.

It is readily apparent that a need is present for a fastener which employs a one-piece stud arrangement of the quarter-turn type which is adaptable for use with a low cost one-piece receptacle or a receptacle which is integrally formed in one of two members to be fastened. The savings in cost of such a structure would be significant.

SUMMARY OF THE INVENTION

With the above background in mind, it is among the primary objectives of the present invention to provide a stud for a quarter-turn fastener with a spring member thereon so that the stud head provides the spring action required to detent lock the stud on a rigid cam follower on a receptacle or a member to be fastened. The stud provides for a low cost receptacle or a no cost receptacle depending upon whether the receptacle is a separate element or integrally formed in the member to be fastened. Furthermore, the construction of the stud is such as to minimize the use of material and manufacturing time so that a spring detent locked quarter-turn fastener is provided at minimum cost. Also, the minimum number of parts lowers cost by reducing on site assembly time.

In summary, a stud is provided for interengagement with a rigid receptacle to form a fastener assembly. The stud includes an elongated body member with an enlarged head on one end. A gripping surface is on the head to facilitate grasping and rotation of the stud. A spring is also on the head to facilitate axial movement of the stud with respect to the rigid receptacle. One of the stud and receptacle has a spiral cam slot terminating in a locking detent thereon. The other of the stud and receptacle has at least one laterally extending cam follower. When the stud and receptacle are positioned in one of two members respectively and brought into interengagement, the cam slot will be aligned with each cam follower. Relative rotation between the stud and receptacle causes the cam follower to enter the cam slot until seated in the locking detent with the assistance of the spring permitting axial movement of the stud with respect to the rigid receptacle thereby locking the two members together. Relative rotation between the stud and receptacle in the opposite direction will move each cam follower from the locking detent and along the cam slot until disengagement occurs whereupon the stud and receptacle can be separated and the two members released with the assistance of the spring permitting axial movement of the stud with respect to the rigid receptacle.

Also contemplated in the present invention is the method of forming a head and body in interlocking arrangement with the appropriate gripping surface and spring in the resultant one-piece stud.

With the above objectives, among others, in mind, reference is had to the attached drawings.

DESCRIPTION OF THE PREFERRED EMBODIMENT

Figure 1:
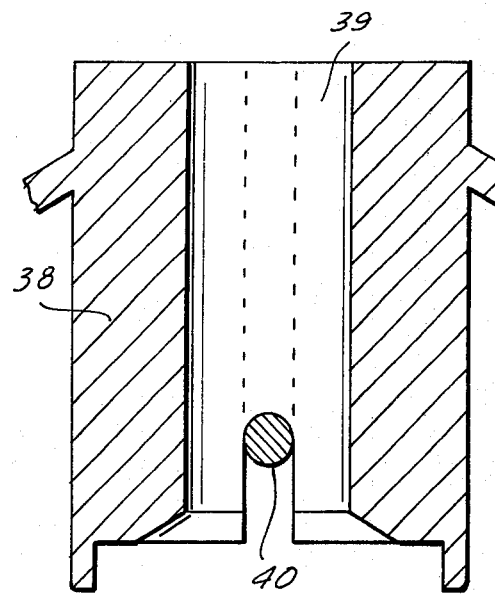
FIG. 1 is an exploded sectional side view of the stud of the invention in position for engagement with an appropriate receptacle.
Figure 1:
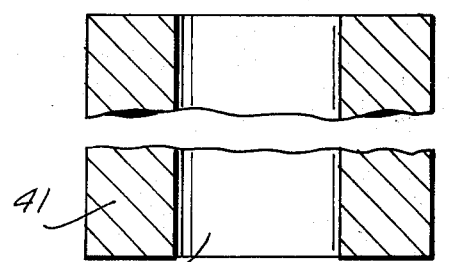
Figure 1:
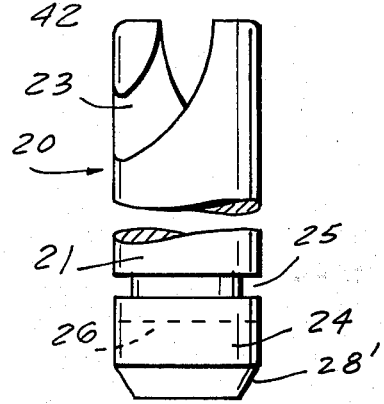
Figure 1:
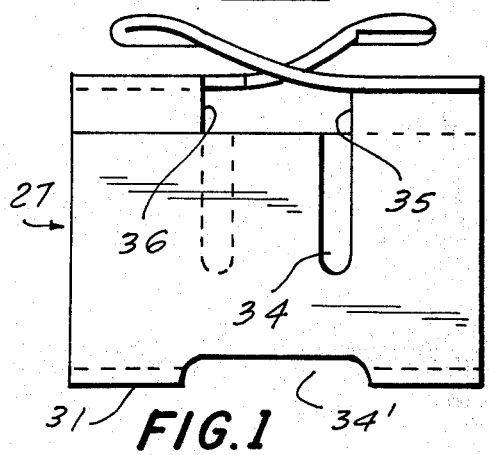

Stud 20 includes a tubular elongated body portion 21 and a head portion 22. Body portion 21 is cylindrical in shape and has a pair of corresponding spiral cam slots 23 in its end distal from head 22. The other end of body 21 is integral with the base 24 of head 22. Base 24 is formed by providing an annular groove 25 in the circumferential outer surface of body 21. A diametrically positioned slot 26 is in base 24 and is spaced from groove 25. Slot 26 and groove 25 cooperate with the remainder of base 24 to receive the remainder of head 22 which is formed by gripping wing and spring portion 27. To assist in assembly of wing spring portion 27 with base 24 appropriate surfaces including beveled tip 28' are provided on base 24.

Wing spring portion 27 includes a U-shaped wing 28 and a pair of depending helical projections 29 and 30. The wing spring portion 27 is formed of a material such as spring steel which is stiff and yet contains sufficient resilience so as to be resiliently deformable. In this manner, projections 29 and 30 form leaf springs for the purpose of imparting spring-like action to the stud when assembled as part of the fastener assembly.

Wing portion 28 has a closed end 31 from which extends a pair of opposing rectangular shaped sides 32 and 33. Each side terminates in one of the two helical projections. As shown, side 32 terminated in depending projection 29 and side 33 terminates in depending projection 30.

Figure 2:
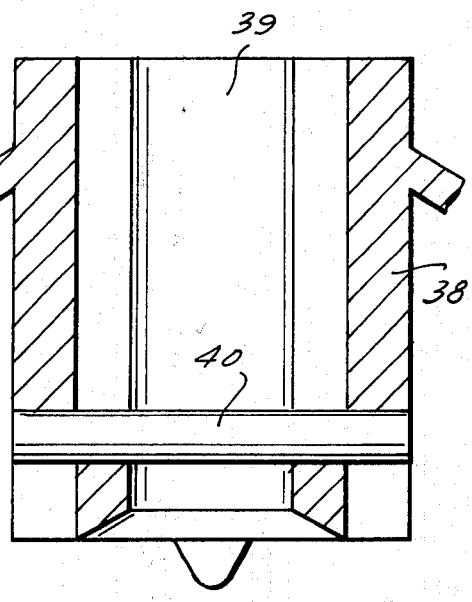
FIG. 2 is an exploded sectional view thereof rotated 90°.
Figure 2:
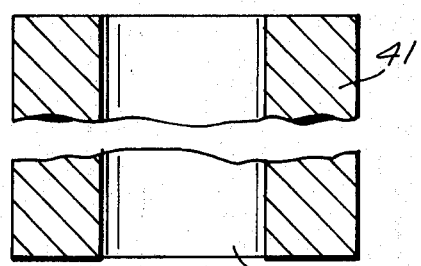
Figure 2:
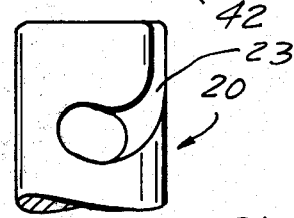
Figure 2:
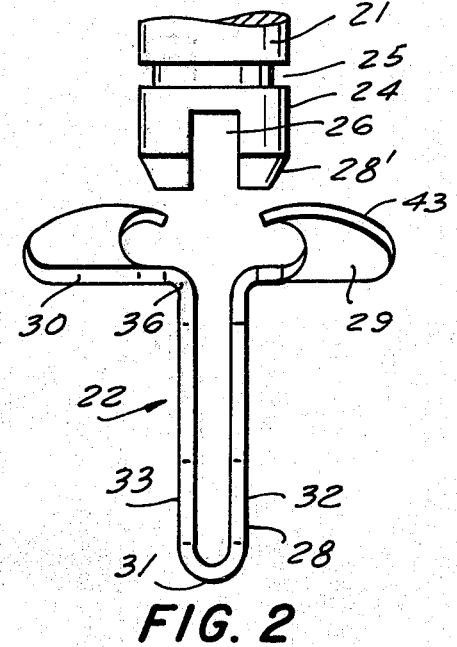
Figure 3:
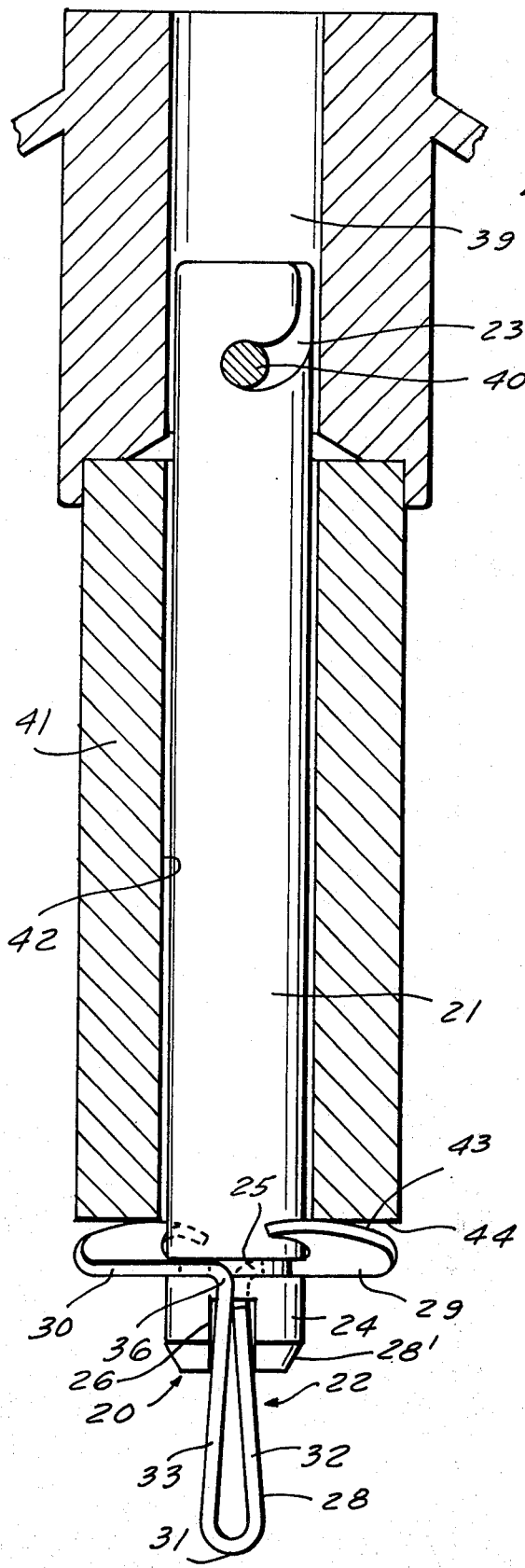
FIG. 3 is a sectional end view of the stud of the invention shown in interengagement with an appropriate receptacle.
Figure 4:
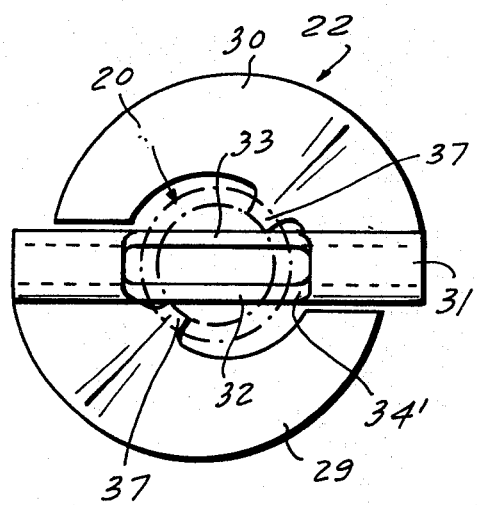
FIG. 4 is an end plan view thereof.

By providing a certain amount of resilience to wing spring portion 28, sides 32 and 33 can be displaced toward one another and when released will tend to turn to the relaxed position where the sides are substantially parallel to one another as depicted in FIG. 2. The compressed position is best depicted in FIG. 3. Naturally, the other acceptable materials for spring wing portion 28 and for the remainder of stud 20 can be readily envisioned and would include other conventional metals and plastics.

Each side of wing portion 28 includes a vertical notch 34 located generally in the central aea of each side but not aligned with the similar notch in the other side. Notches 34 form a surrounding centrally located weakened zone to facilitate displacement of the sides 32 and 33 toward one another. Additionally, the central portion of closed end 31 is formed with a recess 34' which assists in weakening wing portion 28 so that sides 32 and 33 can be displaced toward one another.

The portion of each side which integrally contains a helical projection is longer than the remainder of the sides so that shoulders 35 and 36 are formed. The shoulders are opposed so as to prevent lateral movement of wing spring portion 27 with respect to base 24 after the stud has been assembled.

Along the length of each projection 29 and 30 is a tab 37 for placement into annular groove 25 so that axial displacement of wing spring portion 27 with respect to the remainder of the stud is prevented.

In manufacture and assembly of stud 20, elongated body member 21 is integrally formed with base portion 24 of head 22 and with an appropriate spiral cam slot 23 in the end of the tubular member distal from the head base end. Annular groove 25 is formed in the tubular member at the location of base 24, slot 26 is formed in base 24, and the base is beveled at its terminal end 28'.

Wing spring portion 27 of head 22 is formed of a single piece of material such as spring steel and is deformed so as to provide a U-shaped wing portion 28 and a pair of helical projections 29 and 30 forming the spring portion. The unitary wing spring portion 27 is provided with the appropriately located notches 34, recess 34', and tabs 37. Additionally, the configuration of the wing spring portion is such that the portion of sides 32 and 33 from which projections 29 and 30 extend respectively is longer than the remainder of each side 32 and 33 to form shoulders 35 and 36.

In assembly, sides 32 and 33 are grasped and displaced toward one another with the assistance of the central weakened zone provided with the help of notches 34 and recess 34'.

Sides 32 and 33 are then extended into slot 26 with the leading edge being the open end of the U-shaped wing portion 28. When fully positioned within the slot, the sides are released so that they will tend to return to the initial configuration with the sides being substantially parallel. The width of slot 26 is not sufficient to permit the sides to return to the fully relaxed position so that the sides exert a force against the side walls of the slot and frictionally engage therewith so as to assist in retaining the sides within the slot. In this position, depending projections 29 and 30 will extend downward along body 21 with tabs 37 in alignment with the annular groove 25. Deformation of the projections 29 and 30 toward annular groove 25 will position tabs 37 in the annular groove. In this manner, displacement of wing spring portion 27 from base 24 is prevented in the axial direction primarily by the capturing of tabs 37 within groove 25.

Additionally displacement of wing spring portion 27 in the radial direction along the length of slot 26 is prevented by engagement of downwardly extending shoulders 35 and 36 with the side walls of base 24 beyond notch 26. Since the shoulders 35 and 36 are substantially diametrically opposed, radial motion is prevented in both directions. In the above manner, wing spring portion 27 is affixed to base portion 24 to complete assembly of the stud.

In use, stud 20 is designed for engagement with a rigid receptacle or as shown with engagement with receiving portions on one of two members to be fastened. A cylindrical element such as a wheel hub 38 with an appropriate opening 39 for reception of the stud is depicted. Rigidly mounted in the opening is a transverse pin 40 designed for interengagement with the slot 23 in stud 20. Alternatively, the engaging pin can be replaced by a pair of opposing tabs on the inner surface of opening 39 or any similar structure adapted for engagement with the slotted stud. It should also be kept in mind that the slot 23 could be located on the receptacle member 38 with the transverse pin or pins being located and extending from the stud body 21. Operation would be the same with the slot and pin being interchanged.

A member 41 is depicted for fastening to member 38 and contains a central opening 42 of sufficient diameter for the passage of stud body 32. However, opening 42 is of less diameter than the diameter of the undersurface 43 of projections 29 and 30. Consequently, undersurface 43 forms an engaging surface between stud 20 and the exposed surface 44 of member 41.

Member 41 is aligned with member 38 so that opening 42 is in alignment with opening 39. Stud 20 is then inserted through the aligned openings until slot 23 comes into alignment with pin 40. In this position, undersurface 43 of projections 29 and 30 will be in engagement with the rear exposed surface 44 of member 41.

Thereafter, gripping of wing portion 28 and rotation of stud 21 will cause pin 40 to travel along cam slot 23 into a terminal locking detent as depicted in FIG. 3. The relative axial movement of stud 20 with respect to pin 40 so that the pin will be permitted to travel along slot 33 is accommodated by the nature of projections 29 and 30 acting as leaf springs. The projections will be axially biased a sufficient amount to permit full travel of pin 40 into the locked position. Approximal one-quarter turn of stud 20 will bring the assembly into the fully locked position. In the locked position the biased projections 29 will bear against surface 44 and tend to hold members 41 and 38 in tight interengagement.

For disassembly, wing head 28 is grasped and rotated in the opposite direction so as to permit pin 40 to travel along slot 33 from the locking detent to a disengaged position whereupon stud 20 can be removed from openings 42 and 39 and members 41 and 38 can be diassembled.

Thus, the above discussed objectives of the present invention are effectively attained. Although several somewhat preferred embodiments have been disclosed and described in detail herein, it should be understood that this invention is in no sense limited thereby and its scope is to be determined by that of the appended claims.

What is claimed is:

1. A method of forming a stud for interengagement with a rigid receptacle to form a fastener assembly comprising:

providing an elongated body member with a locking surface in one end thereof for interengagement with a locking portion of the receptacle so that relative rotation between the stud and receptacle causes relative axial movement therebetween as the locking surfaces move into the locked position and relative rotation in the opposite direction causes relative axial movement between the stud and receptacle as the locking surfaces move into the disengaging position to permit separation of the stud and receptacle;

locating a slot in the opposite end of the elongated body member and an annular groove adjacent the slot and spaced therefrom on the outer surface of the elongated member;

forming a wing portion and spring assembly for mounting on the elongated member by forming a U-shaped wing portion with opposing rectangular sides and a helical shaped projection extending from each side in an arcuate direction so as to terminate in a free end;

compressing the two opposed sides toward one another and inserting the open end of the wing portion into the slot in the end of the elongated member and postioning a portion of each helical projection in the annular groove in the elongated member; and releasing the compressed sides so that they move away from one another and into engagement with surfaces in the slotted head with the sides extending radially and axially with respect to the elongated member to form a gripping surface thereon and the free ends of the helical projections extending along the length of the tubular member to form a spring surface for interengagement with members being fastened so that relative axial movement between the tubular member and the receptacle will be absorbed by the resilient spring-like surface formed by the helical projections.

2. The invention in accordance with claim 1 wherein a vertical notch is formed in each side of the wing portion intermediate the sides thereof so as to weaken the central portion of the sides and facilitate movement of the sides toward and away from one another as the wing portion is mounted to the elongated member.

3. The invention in accordance with claim 1 wherein a central recess is formed in the portion of the wing portion where the sides interengage intermediate the radial edges thereof so as to form a central portion of weakening to assist in movement of the sides toward and away from one another as the wing portion is assembled with the elongated member.

4. The invention in accordance with claim 1 wherein the portion of each side from which the helical projection extends is longer than the remainder of each side so as to form a shoulder for interengagement with the slotted head to prevent radial movement of the wing portion with respect to the slot when the wing portion is assembled with the elongated member, the shoulders being located at diametrically opposed points with respect to the head so that radial movement of the wing portion with respect to the elongated member is prevented in both directions.

* * * * *